US009650293B2

(12) United States Patent
Christy et al.

(10) Patent No.: US 9,650,293 B2
(45) Date of Patent: May 16, 2017

(54) PROCESS AND APPARATUS FOR SLAKING LIME AND DISSOLVING SCALE

(71) Applicant: RDP Technologies, Inc., Conshohocken, PA (US)

(72) Inventors: Richard W. Christy, Eagleville, PA (US); Michael Quici, Ambler, PA (US); Louis Litz, Ambler, PA (US)

(73) Assignee: RDP Technologies, Inc., Conshohocken, PA (US)

(*) Notice: Subject to any disclaimer, the term of this patent is extended or adjusted under 35 U.S.C. 154(b) by 0 days.

(21) Appl. No.: 14/673,099

(22) Filed: Mar. 30, 2015

(65) Prior Publication Data
US 2015/0203386 A1    Jul. 23, 2015

Related U.S. Application Data

(63) Continuation-in-part of application No. 13/580,221, filed as application No. PCT/US2011/027109 on Mar. 4, 2011, now Pat. No. 9,023,312.

(60) Provisional application No. 61/311,052, filed on Mar. 5, 2010.

(51) Int. Cl.
| | |
|---|---|
| C04B 2/00 | (2006.01) |
| C04B 2/02 | (2006.01) |
| C04B 2/04 | (2006.01) |
| C04B 2/06 | (2006.01) |
| C04B 2/08 | (2006.01) |
| C02F 1/00 | (2006.01) |

(Continued)

(52) U.S. Cl.
CPC ............. *C04B 2/08* (2013.01); *C02F 1/687* (2013.01); *C04B 2/04* (2013.01); *C04B 2/066* (2013.01); *C02F 1/66* (2013.01); *C02F 2209/02* (2013.01); *C02F 2303/04* (2013.01); *C02F 2303/22* (2013.01)

(58) Field of Classification Search
CPC .... C04B 2/00; C04B 2/02; C04B 2/04; C04B 2/06; C04B 2/066; C04B 2/08; C02F 1/66; C02F 1/685; C02F 1/687; C02F 2209/00; C02F 2209/005; C02F 2209/04; C02F 2303/00; C02F 2303/04; C02F 2303/22
See application file for complete search history.

(56) References Cited

U.S. PATENT DOCUMENTS

| | | |
|---|---|---|
| 2,904,401 A | 9/1959 | Booth |
| 3,511,600 A | 5/1970 | Kim |
| 3,886,064 A | 5/1975 | Kosonen |

(Continued)

FOREIGN PATENT DOCUMENTS

| | | |
|---|---|---|
| WO | 9636570 A1 | 11/1996 |
| WO | 2006113176 A2 | 6/2006 |

(Continued)

*Primary Examiner* — Natasha Young
(74) *Attorney, Agent, or Firm* — Paul & Paul

(57) ABSTRACT

Process and apparatus is disclosed for providing a chemical reaction between calcium oxide containing grit particles to produce calcium hydroxide and heat, capturing the heat of hydration and using it to preheat water initially at ambient temperature, to rise to an elevated temperature to increase the amount of lime present in the water to a supersaturated lime suspension level, with the chemical reaction running to completion, followed by cooling. Heat from a water jacket may be used to raise the temperature in the lime slaker.

18 Claims, 4 Drawing Sheets

(51) Int. Cl.
*C02F 1/66* (2006.01)
*C02F 1/68* (2006.01)

(56) References Cited

U.S. PATENT DOCUMENTS

| | | |
|---|---|---|
| 3,969,094 A | 7/1976 | Dunson, Jr. et al. |
| 4,064,744 A | 12/1977 | Kistler |
| 4,166,997 A | 9/1979 | Kistler |
| 4,261,953 A | 4/1981 | Gisler |
| 4,454,770 A | 6/1984 | Kistler |
| 4,482,528 A | 11/1984 | Emmett |
| 4,539,024 A | 9/1985 | Stehning et al. |
| 4,588,559 A | 5/1986 | Emmett |
| 4,741,896 A | 5/1988 | Thomas, Sr. |
| 5,013,458 A | 5/1991 | Christy, Sr. et al. |
| 5,094,752 A | 3/1992 | Davis et al. |
| 5,217,625 A | 6/1993 | Khan et al. |
| 5,229,011 A | 7/1993 | Christy, Sr. et al. |
| 5,292,353 A | 3/1994 | Kaufman et al. |
| 5,313,022 A | 5/1994 | Piroozmandi et al. |
| 5,336,481 A | 8/1994 | Muzik et al. |
| 5,346,616 A | 9/1994 | Christy, Sr. et al. |
| 5,368,731 A | 11/1994 | Pesotini |
| 5,401,402 A | 3/1995 | Christy et al. |
| 5,405,536 A | 4/1995 | Christy |
| 5,433,844 A | 7/1995 | Christy |
| 5,554,279 A | 9/1996 | Christy |
| 5,573,656 A | 11/1996 | Santos |
| 5,618,442 A | 4/1997 | Christy |
| 5,647,996 A | 7/1997 | Yablonsky et al. |
| 5,741,471 A * | 4/1998 | Deutsch ............. C01F 11/18 423/430 |
| 5,746,983 A | 5/1998 | Stephansen |
| 5,770,823 A | 6/1998 | Piroozmandi |
| 5,783,073 A | 7/1998 | Christy et al. |
| 5,895,763 A | 4/1999 | Edstrand et al. |
| 5,965,103 A * | 10/1999 | Golley ............. C04B 2/04 423/155 |
| 6,033,577 A | 3/2000 | Braband et al. |
| 6,092,301 A | 7/2000 | Komanowsky |
| 6,296,761 B1 | 10/2001 | Scheuerman, III |
| 6,568,842 B1 | 5/2003 | Murray |
| 7,024,800 B2 | 4/2006 | Gorbell et al. |
| 7,048,900 B2 | 5/2006 | Mathur et al. |
| 7,416,673 B2 | 8/2008 | Christy et al. |
| 7,669,348 B2 | 3/2010 | Christy et al. |
| 7,685,737 B2 | 3/2010 | Gorbell et al. |
| 8,065,815 B2 | 11/2011 | Christy et al. |
| 8,153,088 B2 | 4/2012 | Stephansen |
| 2003/0051841 A1 | 3/2003 | Mathur et al. |
| 2004/0175324 A1 | 9/2004 | Hassibi |
| 2006/0231507 A1 | 10/2006 | Christy et al. |
| 2006/0231511 A1 | 10/2006 | Christy et al. |
| 2007/0056902 A1 | 3/2007 | Kelly |
| 2007/0281059 A1 | 12/2007 | Smith |
| 2008/0057555 A1 | 3/2008 | Nguyen |
| 2008/0185324 A1 | 8/2008 | Christy et al. |
| 2010/0196258 A1 | 8/2010 | Stephansen |
| 2011/0039318 A1 | 2/2011 | Lehr |
| 2011/0089115 A1 | 4/2011 | Lu |
| 2014/0034582 A1 | 2/2014 | Christy et al. |
| 2014/0175026 A1 | 6/2014 | Christy et al. |

FOREIGN PATENT DOCUMENTS

| | | |
|---|---|---|
| WO | 2008045857 A2 | 8/2008 |
| WO | 2008123778 | 10/2008 |

* cited by examiner

PROCESS AND APPARATUS FOR SLAKING LIME AND DISSOLVING SCALE

CROSS-REFERENCE TO RELATED APPLICATIONS

This application is a continuation-in-part of U.S. patent application Ser. No. 13/580,221, filed Aug. 21, 2012, which is based on International application no. PCT/US2011/027109, now WO/2011/109669, filed Mar. 4, 2011, which claims the priority of provisional application Ser. No. 61/311,052, filed Mar. 5, 2010.

BACKGROUND OF THE INVENTION

1. Field of the Invention

The present invention is directed to a process and apparatus for treating waste water, sewage sludge and/or purifying drinking water via a lime slaking process, and a process and apparatus for dissolving scale that forms on internal surfaces of a lime slaker and related equipment, including an aging tank and a grit separation device, by introducing an acid into the system.

2. Brief Description of the Prior Art

Lime has been used in the treatment of sewage sludge to remove pathogens, lime stabilization of waste water, pasteurization of sludge and purification of drinking water by adjusting the pH of the water. Examples of such processes involving the use of lime can be found in U.S. Pat. Nos. 5,013,458; 5,229,011; 5,346,616; 5,401,402; 5,405,536; 5,433,844; 5,554,279; 5,618,442; and 7,416,673, which contents are incorporated herein by reference.

Calcium oxide (CaO), is mixed with water ($H_2O$) to form calcium hydroxide ($Ca(OH)_2$). The chemical reaction which occurs during such mixing gives off heat in the form of an exothermic reaction. When this reaction is done in the presence of excess water it is commonly referred to as lime slaking. This process is accomplished in a device known as a lime slaker. The resulting mixture of $Ca(OH)_2$ and water is known as a lime slurry. Lime slurries are known to have some unique properties, one of which is an inherent ability to form scale on surfaces which come into contact with the lime slurry. The formation of scale, or "scaling" can render the various delivery systems, such as pipes, troughs, conduits, etc. unusable over time due to the build-up of scale. Accordingly, such scale build-up requires frequent cleaning and descaling of the equipment that is used to handle lime slurries. Cleaning and descaling operations can be considerably labor and cost intensive.

Lime slurries also contain a certain amount of inert material that is commonly referred to as grit. Grit results because the lime contains a certain amount of material other than calcium oxide (CaO). Typically, lime contains approximately 90%-95% CaO, and 5%-10% inert material, or grit. Quicklime is more than 92% pure.

The presence of grit in a lime slurry can cause numerous problems, including grit build-up in downstream process chambers or vessels, grit acting to plug or clog nozzles or any orifices through which the slurry passes, and abrasions caused to treatment equipment and slurry delivery equipment such as pumps, pipes, valves, etc. because of the abrasive nature of grit particles.

Various techniques have been attempted for separation of unwanted grit that is contained within a lime slurry.

U.S. Pat. No. 4,482,528 describes some of the problems that are encountered when trying to separate unwanted grit from a lime slurry. Using a gravity classifier to separate grit from a lime slurry when discharging from a lime slaker is described as being unable to effectively remove particles smaller than 100 mesh (140 microns).

The gravity separation of grit, directly after the slaking of lime in a lime slaking device, can be problematic, in that the amount and size of the grit removed will vary as the rate of discharge from the lime slaker varies. At high discharge rates from the slaker, the slurry will have less retention time in the grit separation chamber, which can be insufficient for the smaller grit particles to settle, such that the grit particles can be conveyed through the separation chamber and into the finished lime slurry, resulting in inconsistent and highly variable amounts of grit removal.

U.S. Pat. No. 4,482,528 attempts to improve upon gravity separation of grit by the use of a cyclone followed by at least one gravity classifier device. The cyclone operates centrifugally, and removes grit and lime, which discharges from the cyclone into a gravity classifier, wherein dilution water is added in order to allow the grit to settle in the classifier.

U.S. Pat. No. 5,746,983 describes an apparatus and method for the slaking of lime which includes a process under constant supervision. The calcium oxide is delivered to the lime slaker and mixed with ambient water through a conveyor which delivers the quicklime at distinct intervals by means of a mixer. The apparatus uses load cells to measure the weight of the lime and/or water. The apparatus and method can be run on small quantities of lime and in batches. This invention is designed to enable non-continuous operation in intervals, and an attempt to limit maintenance on operating systems.

Accordingly, a need remains to provide a method for producing a high-quality supersaturated lime suspension which can be continuously and automatically delivered in precise and variable dosages with little or no supervision and a method for automatically removing scale build-up.

SUMMARY OF THE INVENTION

This invention provides a method of and apparatus for producing a high-quality supersaturated lime suspension for use in lime slaking processes comprising mixing lime containing CaO and grit particles and pre-heated water that is above ambient water temperature in a lime slaker to form a supersaturated lime suspension, cooling the supersaturated lime suspension, and delivering the supersaturated lime suspension to a separation device which separates grit particles from the supersaturated lime suspension, thereby recovering a high-quality supersaturated lime suspension. An automated system comprising the method steps of this method is also an object of this invention.

As used herein, "supersaturated lime suspension" (SLS) is defined to include either lime particles dissolved in water or a suspension of small lime particles in water.

In addition, an acid wash system is provided which comprises an automated method and apparatus for removing scale build-up in a lime slaker, a lime slurry aging tank, and/or a delivery system comprising monitoring scale build-up in the lime slaker, the lime slurry aging tank, and/or the delivery system; and at a pre-determined set point of scale build-up or time, delivering an acid wash solution to the lime slaker, the lime slurry aging tank, and/or the delivery system, thereby dissolving the scale build-up.

It is an object of the present invention to provide a process for producing slaked lime slurry comprising the following steps:

(a) providing a slaking vessel having at least one support location that is provided with at least one load cell, wherein the load cell provides a signal indicative of a total weight of the slaking vessel and its contents;

(b) charging a predetermined weight of water to the slaking vessel by using the signal from the load cell to stop charging water to the slaking vessel when the signal from the load cell indicates that the predetermined weight of water has been charged to the slaking vessel, wherein the water has a temperature;

(c) charging a predetermined weight of lime feed stock to the slaking vessel by using the signal from the load cell to stop charging lime feed stock to the slaking vessel when the signal from the load cell indicates that the predetermined weight of lime feed stock has been charged to the slaking vessel, wherein the lime feed stock comprises calcium oxide (CaO), and wherein the step of charging a predetermined weight of lime feed stock to the slaking vessel is performed after the step of charging a predetermined weight of water to the slaking vessel;

(d) allowing the calcium oxide to undergo a slaking reaction with the water in the slaking vessel at least until the slaking reaction substantially reaches completion, wherein the predetermined weight of water charged to the slaking vessel is in excess of the weight of water required by stoichiometry of the slaking reaction for hydration of all the calcium oxide in the predetermined weight of lime feed stock charged to the slaking vessel;

(e) controlling the temperature of the water such that the water is at a temperature within a predetermined range before the lime feed stock is charged to the slaking vessel, the predetermined temperature range of the water being selected such that the contents of the slaking vessel are at a temperature in the range of 175° F. to 195° F. at least when the slaking reaction substantially reaches completion, and wherein no cooling or dilution water is added to the contents of the slaking vessel after the step of charging a predetermined weight of lime feed stock to the slaking vessel and before the slaking reaction substantially reaches completion; and (f) discharging the slaked lime slurry from the slaking vessel after the slaking reaction substantially reaches completion.

It is another object of the present invention to provide a process for producing slaked lime slurry wherein the contents of the slaking vessel are at a temperature in the range of 180° F. to 195° F. at least when the slaking reaction substantially reaches completion.

It is still another object of the present invention to provide a process for producing slaked lime slurry wherein the lime feed stock comprises at least 90 percent calcium oxide (CaO) and at least some grit but not exceeding 10 percent grit.

It is yet another object of the present invention to provide a process for producing slaked lime slurry wherein the weight of lime feed stock charged to the slaking vessel is 5 percent to 45 percent of the total weight of the water and the lime feed stock charged to the slaking vessel.

It is yet another object of the present invention to provide a process for producing slaked lime slurry wherein the weight of water and the weight of lime feed stock charged to the slaking vessel are in a ratio selected such that a slaked lime slurry resulting from the weight of water and the weight of lime feed stock charged to the slaking vessel is suitable for use in one or more target applications without dilution of the slaked lime slurry by adding water to the slaked lime slurry after the slaking reaction substantially reaches completion.

It is yet another object of the present invention to provide a process for producing slaked lime slurry wherein the temperature of the water before the lime feed stock is charged to the slaking vessel, is controlled to be within a range of 70° F. to 90° F.

It is yet another object of the present invention to provide a process for producing slaked lime slurry comprising, in addition to steps (a) through (f) as set forth above, the additional steps as follows:

(g) providing a slurry aging tank;

(h) providing a grit separation device to remove grit from the slaked lime slurry;

(i) providing a discharge line for circulating slaked lime slurry from the slurry aging tank to the grit separation device, wherein the discharge line passes through one or more dosing locations;

(j) providing a return line from the grit separation device to the slurry aging tank;

(k) conveying the slaked lime slurry from the slaking vessel to the slurry aging tank after the slaking reaction has substantially reached completion;

(l) circulating slaked lime slurry from the slurry aging tank to the grit separation device and returning the slaked lime slurry from the grit separation device to the slurry aging tank to remove grit from the slaked lime slurry; and (m) providing a dosing sub-system to deliver a controlled amount of slaked lime slurry at each dosing location as needed under the control of an operator or a controller.

It is yet another object of the present invention to provide a process for producing slaked lime slurry further comprising, in addition to steps (a) through (m) set forth above, the steps as follows:

(n) repeating the step of controlling the temperature of the water such that the water is at a temperature within a predetermined range before the lime feed stock is charged to the slaking vessel, the step of charging a predetermined weight of water to the slaking vessel, the step of charging a predetermined weight of lime feed stock to the slaking vessel, the step of allowing the calcium oxide to undergo a slaking reaction with the water in the slaking vessel, the step of discharging the slaked lime slurry from the slaking vessel, and the step of conveying the slaked lime slurry from the slaking vessel to the slurry aging tank, in order to provide one or more subsequent batches of slaked lime slurry to the slurry aging tank to ensure that there is an adequate supply of slaked lime slurry in the slurry aging tank as required.

It is yet another object of the present invention to provide a process for producing slaked lime slurry wherein the step of providing a dosing sub-system comprises the steps as follows:

(1) providing a dosing subsystem line in communication with the discharge line and extending to a dosing discharge at a respective dosing location;

(2) providing a first valve in the dosing sub-system line;

(3) providing a grit trap between the first valve and the dosing discharge;

providing a flowmeter between the grit trap and the dosing discharge; and (4) providing a pinch valve between the flowmeter and the dosing discharge.

It is yet another object of the present invention to provide a process for producing slaked lime slurry wherein the step of providing a dosing sub-system further comprises the step of providing a reverse bend in the dosing sub-system line.

It is yet another object of the present invention to provide a process for producing slaked lime slurry further comprising the step of providing one or more baffles in the form of laminar flow plates in the grit separation device of step (h) above for facilitating the separation of grit from the slaked lime slurry.

It is yet another object of the present invention to provide a process for producing slaked lime slurry comprising, in addition to steps (a) through (n) set forth above, the steps as follows:

(o) providing a jacket around the slaking vessel;

(p) cooling the contents of the slaking vessel prior to the step of discharging the slaked lime slurry from the slaking vessel by providing water within the jacket; and (q) using the water from the jacket to provide, at least in part, the weight of water charged to the slaking vessel for producing one of the one or more subsequent batches of slaked lime slurry.

It is yet another object of the present invention to provide a process for producing slaked lime slurry comprising, in addition to steps (a) through (q) set forth above, the steps as follows:

(r) providing a jacket around the slurry aging tank; and (s) arranging for the water provided within the jacket of the slaking vessel to pass through the jacket of the slurry aging tank.

It is yet another object of the present invention to provide a process for producing slaked lime slurry that includes steps (a) through (f) set forth above, wherein the mixture resulting from the weight of water and the weight of lime feed stock charged to the slaking vessel and including reaction products thereof, at any time after the step of charging a predetermined weight of lime feed stock to the slaking vessel and before the step of discharging the slaked lime slurry from the slaking vessel, forms the contents of the slaking vessel, and the process for producing slaked lime slurry further comprising the steps of:

(t) monitoring the temperature of the contents of the slaking vessel using a temperature sensing device; and (u) determining that the slaking reaction has substantially reached completion when the temperature of the contents of the slaking vessel is not increasing over a predetermined time period.

It is yet another object of the present invention to provide a process for producing slaked lime slurry comprising, in addition to steps (a) through (f) set forth above, the steps as follows:

(v) providing a heater for heating at least part of the weight of water to be charged to the slaking vessel; and (w) providing a water temperature sensing device to sense the temperature of the weight of water charged to the slaking vessel, and wherein the step (e) above of controlling the temperature of the water such that the water is at a temperature within a predetermined range before the lime feed stock is charged to the slaking vessel comprises the steps of:

(5) monitoring the temperature of the water being charged to the slaking vessel; and (6) heating at least part of the water to be charged to the slaking vessel to ensure that the weight of water charged to the slaking vessel is at a temperature within the predetermined temperature range.

It is yet another object of the present invention to provide a process for producing slaked lime slurry wherein the weight of water and the weight of lime feed stock charged to the slaking vessel are in a ratio selected such that a slaked lime slurry resulting from the weight of water and the weight of lime feed stock charged to the slaking vessel is suitable for use in one or more target applications without dilution of the slaked lime slurry by adding water to the slaked lime slurry after the slaking reaction substantially reaches completion.

It is yet another object of the present invention to provide a process for producing slaked lime slurry wherein the lime feed stock comprises at least 92 percent calcium oxide (CaO) and 8 percent or less of grit.

It is yet another object of the present invention to provide a process for producing slaked lime slurry wherein the weight of lime feed stock charged to the slaking vessel is 5 percent to 25 percent of the total weight of the water and the lime feed stock charged to the slaking vessel.

It is yet another object of the present invention to provide a process for producing slaked lime slurry wherein the weight of lime feed stock charged to the slaking vessel is 7 percent to 22 percent of the total weight of the water and the lime feed stock charged to the slaking vessel.

It is yet another object of the present invention to provide a process for producing slaked lime slurry wherein the weight of lime feed stock charged to the slaking vessel is 9.5 percent to 20 percent of the total weight of the water and the lime feed stock charged to the slaking vessel.

It is yet another object of the present invention to provide a process for producing slaked lime slurry wherein the weight of lime feed stock charged to the slaking vessel is 9.5 percent to 10.5 percent of the total weight of the water and the lime feed stock charged to the slaking vessel.

It is yet another object of the present invention to provide a process for producing slaked lime slurry wherein the contents of the slaking vessel are at a temperature in the range of 160° F. to 212° F. at least when the slaking reaction substantially reaches completion.

It is yet another object of the present invention to provide a process for producing slaked lime slurry wherein the contents of the slaking vessel are at a temperature in the range of 175° F. to 212° F. at least when the slaking reaction substantially reaches completion.

It is yet another object of the present invention to provide a process for producing slaked lime slurry wherein the contents of the slaking vessel are at a temperature in the range of 175° F. to 195° F. at least when the slaking reaction substantially reaches completion.

It is yet another object of the present invention to provide a process for producing slaked lime slurry wherein no cooling or dilution water is added to the contents of the slaking vessel after the step of charging a predetermined weight of lime feed stock to the slaking vessel is initiated and before the slaking reaction substantially reaches completion.

It is yet another object of the present invention to provide a process for producing slaked lime slurry wherein the predetermined weight of water and the predetermined weight of lime feed stock charged to the slaking vessel are in a predetermined weight ratio of calcium oxide to water that results in a slaked lime slurry that is suitable for use in one or more target applications without dilution of the slaked lime slurry by adding water to the slaked lime slurry after the step of charging a predetermined weight of lime feed stock to the slaking vessel is initiated and before the slaked lime slurry is discharged to a target application from a dosing sub-system at a dosing location.

It is yet another object of the present invention to provide a process for producing slaked lime slurry wherein no water or lime feed stock is added to the contents of the slaking vessel after the step of charging a predetermined weight of lime feed stock to the slaking vessel and before the slaking reaction substantially reaches completion.

It is yet another object of the present invention to provide a process for producing slaked lime slurry wherein no water or lime feed stock is added to the contents of the slaking vessel after the step of charging a predetermined weight of lime feed stock to the slaking vessel and before the slaked lime slurry is discharged from the slaking vessel.

It is yet another object of the present invention to provide a process for producing slaked lime slurry wherein the temperature of the predetermined weight of water charged to the slaking vessel, is controlled to be within a range of 35° F. to 105° F.

It is yet another object of the present invention to provide a process for producing slaked lime slurry wherein the temperature of the predetermined weight of water charged to the slaking vessel, is controlled to be within a range of 35° F. to 80° F.

It is yet another object of the present invention to provide a process for producing slaked lime slurry wherein the temperature of the predetermined weight of water charged to the slaking vessel, is controlled to be within a range of 50° F. to 80° F.

It is yet another object of the present invention to provide a process for producing slaked lime slurry wherein the temperature of the predetermined weight of water charged to the slaking vessel, is controlled to be within a range of 60° F. to 75° F.

It is yet another object of the present invention to provide a process for producing slaked lime slurry wherein the temperature of the predetermined weight of water charged to the slaking vessel, is controlled to be within a range of 60° F. to 70° F.

It is yet another object of the present invention to provide a process for producing slaked lime slurry wherein the temperature of the predetermined weight of water charged to the slaking vessel, is controlled to be about 68° F.

It is yet another object of the present invention to provide an apparatus for producing slaked lime slurry comprising:

a programmable control system;

a slaking vessel having at least one support location that is provided with at least one load cell, wherein the load cell provides a load cell signal indicative of a total weight of the slaking vessel and its contents, the load cell communicating with the programmable control system such that the load cell signal can be received by the programmable control system;

slaking vessel temperature sensing means for sensing the temperature of the contents of the slaking vessel, wherein the slaking vessel temperature sensing means provides a slaking vessel temperature signal indicative of the temperature of the contents of the slaking vessel, the slaking vessel temperature sensing means communicating with the programmable control system such that the slaking vessel temperature signal can be received by the programmable control system;

means for charging water into the slaking vessel, the programmable control system communicating with the means for charging water into the slaking vessel, the programmable control system stopping the charging of water into the slaking vessel when the load cell signal indicates that a predetermined weight of water has been charged into the slaking vessel, wherein the water to be charged into the slaking vessel has a temperature;

means for mixing the content of the slaking vessel, the programmable control system communicating with the means for mixing the content of the slaking vessel, the programmable control system starting operation of the means for mixing the content of the slaking vessel during the step of charging the predetermined weight of water into the slaking vessel;

water temperature control means for controlling the temperature of the water charged into said slaking vessel, said water temperature control means communicating with said programmable control system, said programmable control system controlling said water temperature control means such that the temperature of the water charged into said slaking vessel is within a predetermined water temperature range;

means for charging lime feed stock into the slaking vessel, the programmable control system communicating with the means for charging lime feed stock into the slaking vessel, the programmable control system stopping the charging of lime feed stock into the slaking vessel when the load cell signal indicates that a predetermined weight of lime feed stock has been charged into the slaking vessel, thereby allowing a slaking reaction to take place; and means for discharging the contents of the slaking vessel; the programmable control system communicating with the means for discharging the contents of the slaking vessel, the programmable control system monitoring the temperature of the contents of the slaking vessel using the slaking vessel temperature signal, the programmable control system operating the means for discharging the contents of the slaking vessel to discharge the contents of the slaking vessel when the temperature of the contents of the slaking vessel remains within a predetermined temperature range for a predetermined period of time.

It is yet another object of the present invention to provide an apparatus for producing slaked lime slurry wherein the programmable control system comprises logic means for determining an initial water temperature range for the predetermined weight of water to be charged to the slaking vessel that would result in the contents of the slaking vessel being at a temperature in the range of 175° F. to 195° F. at least when the slaking reaction substantially reaches completion.

It is yet another object of the present invention to provide an apparatus for producing slaked lime slurry including a programmable control system and water temperature control means, wherein the programmable control system controls the temperature of the water charged into the slaking vessel such that the contents of the slaking vessel will be at a temperature in the range of 180° F. to 195° F. at least when the slaking reaction substantially reaches completion, wherein the programmable control system determines the temperature range for the water to be charged to the slaking vessel using at least the predetermined weight of the water to be charged to the slaking vessel and the predetermined weight of the lime feed stock to be charged to the slaking vessel, and wherein the programmable control system operates the water temperature control means such that the water temperature of the predetermined weight of water charged to the slaking vessel is initially within the water temperature range determined by the logic means before the lime feed stock is charged to the slaking vessel.

It is yet another object of the present invention to provide an apparatus for producing slaked lime slurry wherein the logic means determines the water temperature range for the predetermined weight of water charged to the slaking vessel using at least the predetermined weight of the water to be charged to the slaking vessel and the predetermined weight of the lime feed stock to be charged to the slaking vessel.

It is yet another object of the present invention to provide an apparatus for producing slaked lime slurry wherein the programmable control system operates the water temperature control means such that the water temperature of the predetermined weight of water charged to the slaking vessel is within the water temperature range determined by the logic means before the Lime feed stock is charged to the slaking vessel.

It is yet another object of the present invention to provide an apparatus for producing slaked lime slurry wherein the water temperature control means comprises a heater supplied with energy from an auxiliary energy source.

It is yet another object of the present invention to provide an apparatus for producing slaked lime slurry wherein the slaking reaction generates heat.

It is yet another object of the present invention to provide an apparatus for producing slaked lime slurry wherein the slaking vessel has a jacket surrounding an inner compartment where the contents of the slaking vessel are held at least during the slaking reaction.

It is yet another object of the present invention to provide an apparatus for producing slaked lime slurry wherein the water temperature control means comprises piping and one or more valves controlled by the programmable control system to direct at least a portion of the water to be charged to the slaking vessel into and out of the jacket of the slaking vessel to thereby recover at least a part of the heat generated by the slaking reaction and at least reduce the energy required for heating water by the heater.

It is yet another object of the present invention to provide an apparatus for producing slaked lime slurry comprising mixing means for mixing the contents of the slaking vessel.

It is yet another object of the present invention to provide an apparatus for producing slaked lime slurry wherein the predetermined weight of water to be charged to the slaking vessel can include water obtained from the jacket of the slaking vessel, water from a local process water supply source (i.e. the ambient water supply), water from the heater, and mixtures thereof under the control of the programmable control system.

It is yet another object of the present invention to provide an apparatus for producing slaked lime slurry including water temperature control means, wherein the water temperature control means comprises:

a heater;

piping and one or more valves controlled by a programmable control system to direct at least a portion of the water to be charged to said slaking vessel into and out of said jacket to thereby recover at least a part of the heat generated by the slaking reaction and at least reduce the energy required for heating water by the heater;

piping for directing water from said jacket to the heater;

piping and valves for directing one of water from a process water supply source, water from the heater, and a mixture thereof to the slaking vessel.

It is yet another object of the present invention to provide an apparatus for producing slaked lime slurry wherein the contents of the slaking vessel after the slaking reaction substantially reaches completion is in the form of a slaked lime slurry, wherein the slurry aging tank has a jacket surrounding an inner compartment where the slaked lime slurry is stored, and wherein the at least a portion of the water to be charged to the slaking vessel is directed into and out of the jacket of the slurry aging tank before it is directed into the jacket of the slaking vessel.

It is yet another object of the present invention to provide a process of slaking lime in batches comprising the steps of:
(a) providing valves and piping to supply water at an ambient water temperature to a lime slaker;
(b) providing water to the lime slaker;
(c) providing calcium oxide and grit particles to the lime slaker after the step of providing water to the lime slaker;
(d) allowing a chemical reaction to take place, whereby the calcium oxide and water combine to produce calcium hydroxide and heat in an exothermic reaction in the lime slaker;
(e) providing a heating device for preheating water to an elevated temperature above an ambient water temperature, wherein the heating device uses an energy source other than heat from the exothermic chemical reaction of the step of allowing a chemical reaction;
(f) capturing heat of hydration from the exothermic reaction by providing a jacket around the lime slaker and passing water through the jacket;
(g) supplying water from the jacket to the heating device, wherein the step of providing water to the lime slaker comprises supplying water from the heating device to the lime slaker;
(h) controlling the heat supplied to the water from the jacket by the heating device, controlling the amount of water passing from the heating device to the lime slaker, controlling an amount of water at ambient temperature supplied to the lime slaker, and controlling an amount of calcium oxide and grit particles supplied to the lime slaker, at least based upon:
(A) the temperature of the water in the lime slaker prior to the step of providing calcium oxide and grit particles to the lime slaker; and
(B) a predetermined hydration reaction temperature; and
(i) allowing the chemical reaction to run to completion.

BRIEF DESCRIPTION OF THE DRAWING FIGURES

DETAILED DESCRIPTION

Figure 1:
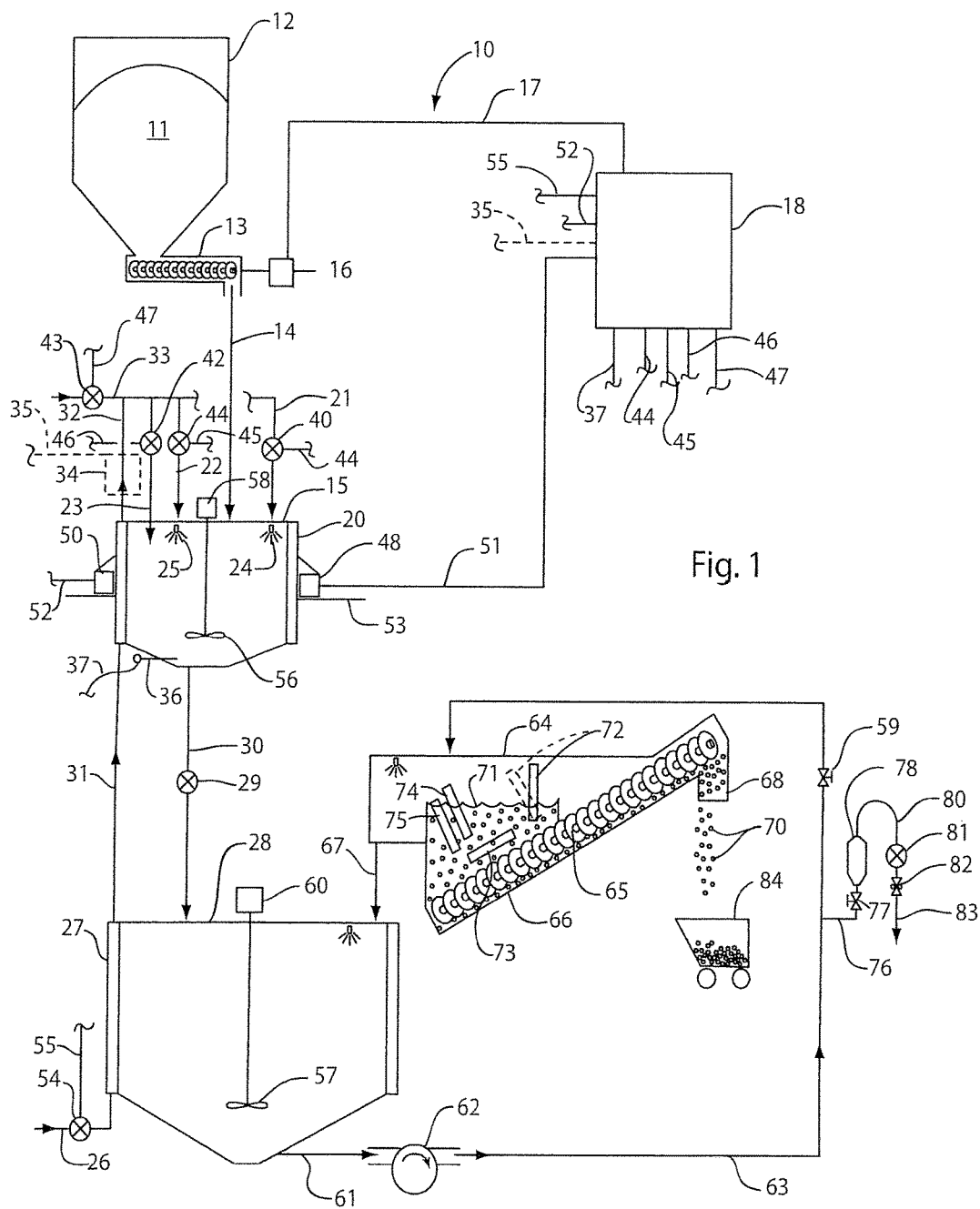
FIG. 1 is a schematic of the system and method for producing high quality SLS according to the invention.

First, it will be noted that in FIG. 1, the lime slaking system and its components are principally illustrated, along with an aging tank and grit classifier, with various sensors, controls and delivery lines.

Figure 3:
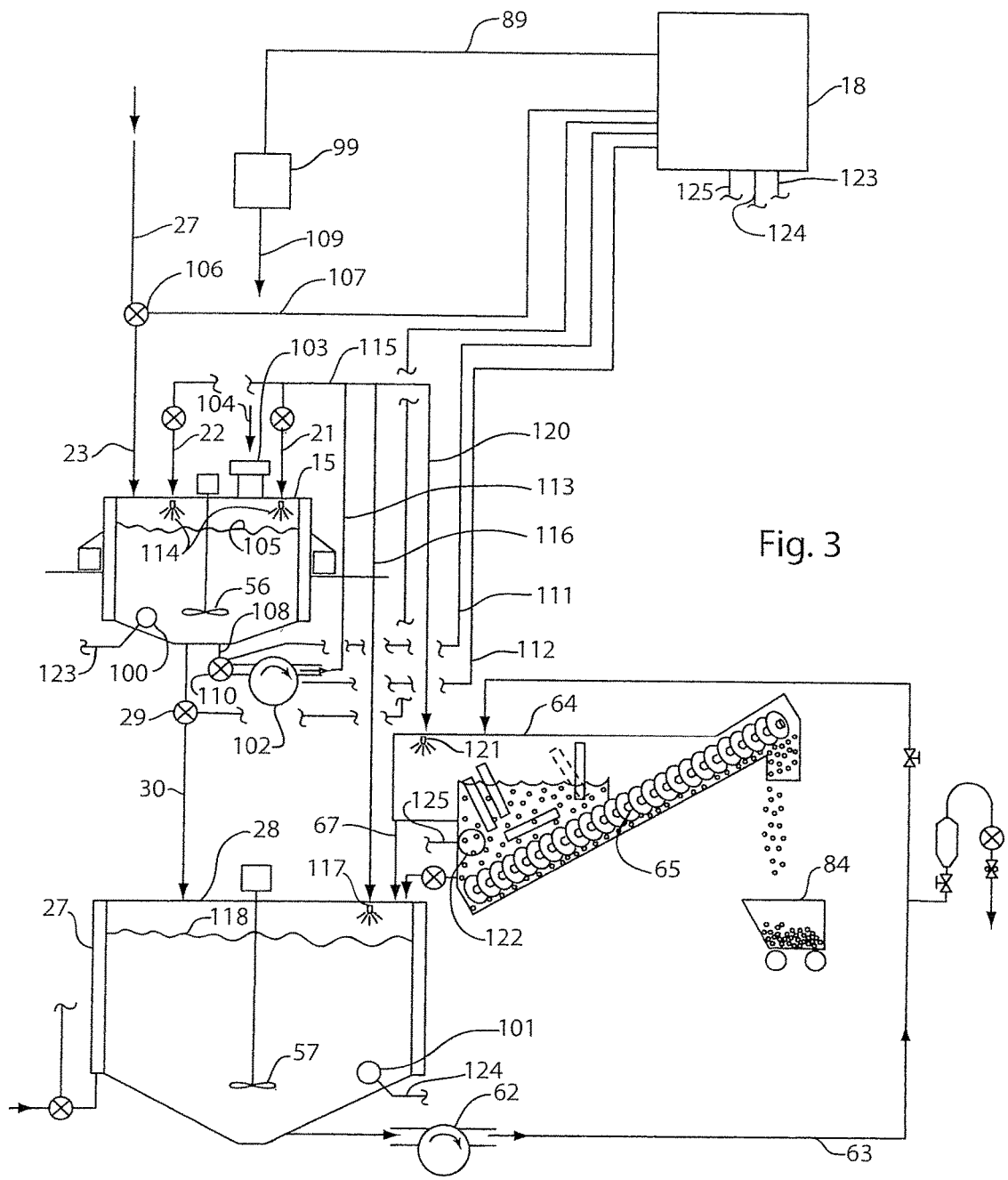
FIG. 3 is a schematic of the acid wash system in accordance of this invention, whereby scale is removed from the various components of the system.

In FIG. 3, many of the same components as are illustrated in FIG. 1 are also illustrated, but wherein FIG. 3 emphasizes the acid wash system, its sensors and controls. It will be understood that the system of this invention can be and preferably is a combination of that which is illustrated in each of FIGS. 1 and 3, but that, for simplicity of presentation and ease of understanding, FIG. 1 is principally directed to the lime slaking system and related components, whereas FIG. 3 is principally directed to the acid wash system and related components.

Figure 2:
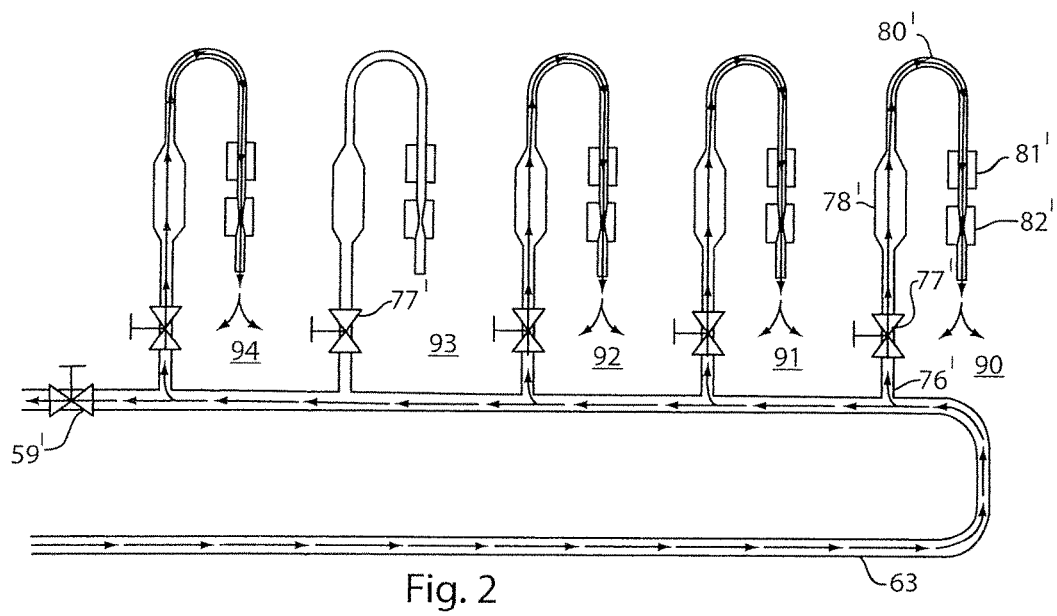
FIG. 2 is a schematic fragmentary view of a multi-point precision dosing arrangement, wherein the SLS of slurry from a slurry loop pump delivers SLS to a plurality of dosing locations, which can be at different dosing rates as the slurry is pumped to a grit classifier.

In FIG. 1 there is illustrated a system that comprises apparatus and method to automatically and continuously deliver precise doses of high quality SLS and in FIG. 2, the doses are shown to be delivered at a plurality of locations. In the system as illustrated in FIGS. 1 and 2, the operating system is capable of functioning with little or no operator attention, input, or routine maintenance.

In FIG. 1, the system is generally designated by the numeral 10. Lime 11 is present in a lime storage silo 12 and is delivered via a delivery auger, conveyor or other delivery device 13 via a suitable delivery line 14, to a lime slaker 15. The operation of the delivery device 13 may be controlled by a suitable preferably electric motor 16 that in turn, is automatically activated via a control line 17 from a programmable logic computer 18.

The lime 11 in the lime storage silo 12 includes grit particles. In the lime slaker 15, pre-heated water is introduced at about 10°-20° F. or more over the temperature of ambient water, in order to form a SLS. The ambient water may be at any temperature that is available to the facility in which the slaking process takes place. The lime is essentially calcium oxide, and when it is mixed with water in the slaker 15, a chemical reaction occurs, in which calcium hydroxide and heat are produced during an exothermic reaction.

The lime slaker 15 is provided with a water jacket 20 around its exterior. The water jacket 20 is adapted to receive water via any of water delivery lines 21, 22 and/or 23. Lines 21 and 22 deliver water into the lime slaker 15 via spray nozzles 24, 25 respectively. Line 23 may deliver water into the lime slaker 15 either through spray nozzle(s), or via any delivery means, as may be desired.

The ambient water is provided, preferably, via line 26, which passes through a water jacket 27 that is disposed around a slurry aging tank 28. The slurry aging tank 28 receives lime slurry from the lime slaker 15, via delivery line 30. The discharge of water from the water jacket 27 of the aging tank 28 is via line 31, to the water jacket 20 of the lime slaker 15, delivering water through the water jacket 20, to line 32, to line 33, and then into the lime slaker 15 via the line 23.

Initially, the ambient water delivered to the lime slaker 15 via lines 26, 31, 32, 33 and any of 21, 22 and 23 and the water would be at the ambient temperature. However, as soon as the exothermic reaction begins to occur in the lime slaker 15, the heat of hydration is captured in the lime slaker water jacket 20, and then begins to pre-heat the water passing into the lime slaker 15 via lines 32, 33 and any of 21, 22 and 23. The process continues, gradually increasing the temperature of the water delivered to the lime slaker as the reaction runs to completion, forming a SLS in the lime slaker 15. If desired, at the commencement of the lime slaking process, before water in the water jacket 20 of the lime slaker 15 has increased in temperature in any substantial amount, the water entering the lime slaker via any of lines 21, 22 and/or 23 may be pre-heated via an electric or other heating device shown in phantom at 34, around water line 32 with the control of the heating device 34 being done via a control line 35, being turned on and off as desired by the programmable logic computer 18 as directed by a temperature sensing device 36 in the lime slaker 15, that, in turn, is connected to the programmable logic computer 18 via a sensing line 37. Thus, when a desired predetermined temperature is reached in the lime slaker 15, the computer 18 may de-activate the electric or other heating device 34. It will be understood that the lime delivery conveyor 13 can be a volumetric feeder device, the control of which is via motor 16 as dictated by the computer 18.

The water that is delivered to the lime slaker 15 via lines 21, 22 and 23 can be controlled by suitable valves 40, 41, 42 and 43 that are also controlled from the computer 18, via respective control lines 44, 45, 46 and 47.

The lime slaker 15 may sit on a plurality of load cells 48, 50, that in turn support the lime slaker 15 on a floor 53, with the load cells 48, 50 being connected to the computer 18 via signal lines 51 and 52, so that the computer 18 can automatically control the inflow of water and lime into the lime slaker 15, by controlling the lime feeder motor 16 and the various water supply valves 40-43. The computer 18 can also control the flow of water to the water jacket 21 of the aging tank 28, by controlling the operation of valve 54 via control line 55. The lime that is introduced via feeder device 13, into the lime slaker 15 will preferably be quicklime which has fewer grit particles therein than some other types of lime.

The load cells may be constructed as are the load cells in U.S. Pat. No. 7,669,348, or any one or more of U.S. Pat. Nos. 5,770,823; 4,064,744; 4,166,997; 4,454,770 and 5,313,022, the complete disclosures of which are herein incorporated by reference.

The lime slaker 15 can be of any desired type capable of accomplishing the ends of this invention, including lime slakers as disclosed in U.S. Pat. Nos. 2,904,401; 5,368,731; 4,261,953 and/or 4,482,528, the complete disclosure of which are herein incorporated by reference.

It will also be understood that the lime slaker 15 and the aging tank 28 are provided with suitable respective mixers 56, 57, motor driven at 58, 60 respectively.

The SLS that is delivered into the aging tank via line 30 is cooled by water entering the water jacket 27 of the aging tank 28 via line 26, in that the water provided via line 26 is at an ambient temperature.

The pre-heated water as described above as being about 10°-20° F. above the ambient water temperature can have some variation in its temperature, in that, as used herein "about" means plus or minus about 10%, unless indicated otherwise. It will be understood that ambient water temperature can vary by location and season.

While it has been described above that any electric or other heating system 34 may be used, initially, to begin to pre-heat water introduced into the lime slaker 15, to heat the water used in the initial reaction, it will be understood that, thereafter, the system 10 of this invention will rely upon capturing the heat from the exothermic reaction, and/or from the cooling that is provided via the water jacket 27 of the aging tank 28. Also, it will be understood that the cooling step can be performed in the lime slaker by dilution, by providing cooling water into the slaker 15 via any of lines 21, 22 and 23. Also, alternatively, or in conjunction therewith, the cooling of the SLS in the lime slaker 15 can be accomplished by transferring heat from the SLS that is in the lime slaker 15, to the water jacket 20. Thus, the cooling step can be the addition of ambient water to the SLS, or the use of water jackets 20, 27, or combinations thereof.

The system 10 also includes a discharge line 61 from the slurry aging tank 28, which discharges to the inlet or suction side of a pump 62, which in turn, delivers the slurry via line 63, to a separation device 64, that is of the gravity operative grit classifier type. The separation device 64 comprises a tank with a sloped auger 65 which conveys grit up a slope 66, which grit has become separated from the liquid 71 in the tank 64, in that the lower end of the auger 65 is immersed in the liquid therein, and operates to engage the grit particles and convey them up the sloped surface to be discharged at 68. The separation device 64 can be either external to or integral with the lime slurry aging tank 28. The auger conveys the grit 70 out the discharge 68 thereof, into a dumpster 84 or other removable discharge unit.

Prior to delivering slurry via line 63 to the separation device 64, a portion of the SLS can be extracted at line 76, through a valve 77, through a grit trap 78, then via line 80, through a magnetic flowmeter 81 and pinch valve 82, to a dosing location therebeneath, at 83.

Figure 1A:
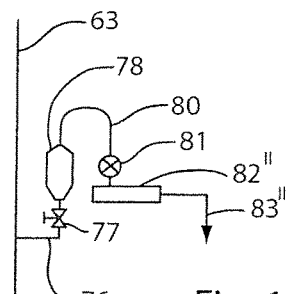
FIG. 1A is a schematic illustration of a portion of FIG. 1, which represents an alternative to the delivery of lime slurry to a dosing location, relative to that illustrated in FIG. 1, in which a metering pump is used lieu of a pinch valve.

FIG. 1A illustrates in schematic form, in which SLS is extracted from line 63, via line 76, through a valve 77, through a grit trap 78, and then via line 80 through a magnetic flowmeter 81 and a metering pump 82" that is used in lieu of the pinch valve 82 of FIG. 1, to a dosing location therebeneath, at 83". The pump 82" uses positive displacement to push the flow of slurry to the dosing location 83". This arrangement is successfully done when one is dosing to an application point 83" that is under pressure, and wherein the pressure is higher than the pressure in the loop 63, so that the pressure in the loop 63 can overcome the pressure at the application point 83". The particular metering pump 82" could be selected in size to overcome the pressure at location 83".

Figure 2A:
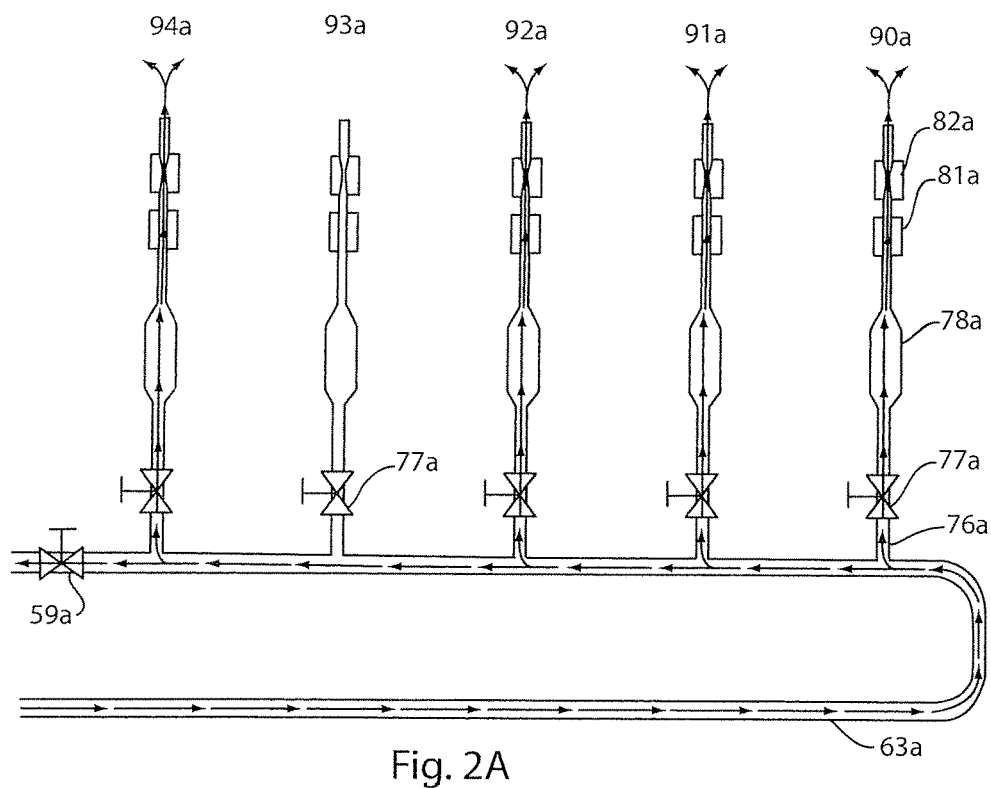
FIG. 2A is an illustration similar to that of FIG. 2, but wherein the dosing locations differ from those of FIG. 2, in that there is not a reverse bend in the line between the grit traps and flowmeters.

In FIG. 2A, the dosing locations 90*a*, 91*a*, 92*a*, 93*a* and 94*a* are shown extending in a generally straight lines commencing at 76*a*, through valves 77*a*, through grit traps 78*a*, through magnetic flowmeters 81*a* and pinch valve 82, to their respective locations, as an alternative arrangement to that illustrated in FIG. 2.

In FIGS. 2 and 2A, respective valve 59' and 59*a* can be applied to substantially close the dosing loops 63, 63*a* to atmosphere, by adjusting the valves 59' or 59*a* to maintain a relatively constant pressure, to create a back pressure from the aging tank 27 of FIG. 1, through delivery line 61, pump 62, delivery line 63, and to the dosing arrangement commencing at line 76 of FIG. 1, or to the dosing arrangements of FIGS. 2 and 2A. In FIG. 1, the valve 59 could, optionally, create a similar back pressure, as may be desired.

The separation device 64 may have one or more baffles in the form of laminar flow plates 72, 73, 74 and 75, one or more of which may be adjustable, as indicated for the baffle plate 72 between the full line and phantom line positions thereof, for facilitating separation of grit from SLS in the separation device 64.

As can be seen in FIG. 1, the baffle plate 73 is oriented approximately parallel to the rotation axis of the auger 65, while the baffle plates 74 and 75 are oriented approximately transversely to the rotation axis of the auger 65.

The extraction of a portion of the SLS from aging tank 28 can be performed more than once on the SLS by returning the SLS from the separation device 64 via line 67, back to the aging tank 28.

The separation device 64 may be provided with a movable wall and associated electric or pneumatic activation drives in accordance with U.S. Pat. No. 7,416,673, and the separation device 64 may be constructed in accordance with the separation devices of any of U.S. Pat. No. 7,416,673 and U.S. patent publication 2008/0185324 published Aug. 7, 2008 and/or published application 2006/0231507 published Oct. 19, 2006, the complete disclosures of which are all herein incorporated by reference. If a movable wall is provided for the separation device 64, such may enable one to vary the cross-sectional surface area of the device 64, which will cause an automatic variation in the volume of the liquid contained within the separation device 64. The return of the SLS back to the aging tank 28 via line 67 enables further purification and grit removal.

As described above, the lime slaker 15 can be mounted on one or more load cells or weighing cells for weighing the contents thereof; namely the lime and water. Load cells are electronic weighing devices that add a precise quantity of water to a known quantity of quicklime to optimize the chemical reaction and indicate the amount of SLS which is contained in the lime slaker 15. The amount of lime and water to be added to the lime slaker 15 can also be determined by volumetric or gravimetric means. The lime slaker 15, as described above, has a motor equipped mixer 56, which can be controlled remotely and automatically. The lime slaker 15 is sized to allow the solid-liquid phase slaking reaction to run until the slaking reaction is complete and the slaking temperature is reached. The slaking temperature is defined as the point in time when the exothermic reaction has stopped and the temperature is no longer increasing, and is at least 3 minutes after the end of lime addition from the lime storage silo 12. The lime slaker 15 of this invention is capable of processing the specified quantity of lime and is designed to operate within 50° F. of a predetermined temperature set point, which is selected to be in the range of about 176°-212° F., and more preferably within the range of 180°-195° F., automatically adjusting to changes in the initial water temperature and variations in lime quality without the need for operator input.

After the slaking reaction is completed, the lime slurry can be diluted to a predetermined concentration set point selected within the range of about 5%-25%, or in the range of 10% to 20%, utilizing the direct weight measurement of lime and water via the load cells. The slurry concentration is within + or −0.5% of the set point (i.e. 9.5%-10.5% for a 10% slurry concentration setting).

As the system runs through several slaking cycles, the preheated water is maintained at a temperature higher than the original ambient water and the ambient water used in the cooling step. This optimizes slaking by starting at a temperature above the initial water temperature.

The lime slurry aging tank 28 can be provided with an access cover at its upper end (not shown). The access cover can be gasketed to contain steam and dust. The bottom of the tank 28 can include a flange connection for the slurry pump 62 (not shown). Also, a separate drain opening can be provided for maintenance and cleaning of the lime slurry aging tank 28, also not shown. The motor 60, as with the motor 58 for the lime slaker can include a speed reducer, which speed reducer can be grease lubricated and directly connected to the mixer shaft assembly.

The slurry pump 62 for delivering slurry from the aging tank 28 to the separation device 64 can be selected in size to provide a desired velocity through a conduit so that the grit particles and the lime particles do not settle within the conduit 63. The selected velocity of flow through all conduits of the invention also provides a scouring action from entrained grit particles, which helps keep the conduits from clogging due to build-up of scale within the conduits. The slurry pump 62 can also contain seals that are self-sealing and require no water, as well as a high pressure switch. The separation device 64 allows for a small quantity of grit particles to remain in the SLS to assist the scouring action and prevention of scale build-up.

An example of the method of the invention is as follows: An initial reaction is run where a pre-determined amount of lime containing CaO and grit particles and ambient water is delivered to the lime slaker 15 which is mounted on load cells. The optimal processing temperature is used to produce the best particle size through precise adjustment of the reaction water and lime ratio. The load cells also allow for making precise adjustments to maintain the optimal temperature and compensate for changes in lime or water characteristics. Depending on the quality of lime used, the reaction will need more or less time to complete, but will generally take about 3-20 minutes. The reaction is allowed to run to completion to allow all the lime to be converted.

Ambient water is added to cool the SLS in order to keep the lime in solution as calcium hydroxide more effectively. Diluting the SLS minimizes downstream scaling as well. After the cooling step, the cooled SLS is delivered to the lime slurry aging tank 28 which is capable of holding two or more batches of SLS from the lime slaker 15. The lime slurry aging tank 28 gradually and continuously delivers the SLS to the separation device 64 where grit is separated from the SLS and removed by means of the slurry pump 62 and via the lime slurry loop 63.

The SLS is then recycled into the lime slurry aging tank 28 and run through the separation device 64 as many times as desired.

The system can also use fine grit classifier hydraulic separation to deliver a high-quality SLS with minimal grit particles. Considering that the specific gravity of grit is approximately three times that of water, 2.65 versus 1.0, grit particles settle at a predetermined rate and adjusting the "rise rate" of the water allows for a precise separation to be made. For example, if grit settles at 3 feet per minute, then the rise rate of water can be set at 2 feet per minute. This hydraulic separation principle is used to keep the grit in the grit trap 78. Dosing of the high quality SLS can also occur at multiple points along the lime slurry loop 63.

With reference now to FIG. 2, there is provided a schematic illustration of the manner in which the lime slurry loop 63 between the aging tank 28 and grit separator 64 can deliver dosing to any of a plurality of locations, even at different rates. It will be seen that the delivery loop 63 receives slurry in the direction of the arrows, and delivers the same to any of a plurality of dosing locations in a multi-dosing location arrangement. Such dosing locations are indicated by the numerals 90, 91, 92, 93 and 94. It will be understood that any number of such dosing locations may exist on the loop 63.

As with the dosing described above with respect to FIG. 1, each of the dosing locations includes a line 76', a valve 77', a grit trap 78', an exit line 80', a magnetic flow meter 81' and a pinch valve 82'.

In the illustration of FIG. 2, the dosing apparatus for location 93 is out of service, because the valve 77' for that location 93 is in the closed position, in order to illustrate that not all dosing locations need to be operative at any given time. The other dosing locations may deliver precise dosing at varying rates. For example, one dosing location may be delivering 9.5 gallons per minute, for example, at dosing location 94, whereas dosing location 92 may be delivering 10.2 gallons per minute, with dosing location 91 delivering 9.7 gallons per minute, and dosing location 90 delivering 10.9 gallons per minute. It will be understood that substantial variation may be provided in the dosing rates, depending upon the desires of an operator.

It will be understood that with respect to the above description of FIGS. 1 and 2, there is provided a method and apparatus for creating a SLS for delivering high quality SLS in which the process water is preheated prior to introduction into the slaking tank through a single or two step process, wherein the heat of hydration is used for preheating water required for a hydration reaction to occur at elevated temperatures between 176° F. and 212° F. This is followed by a second step to reduce the amount of lime that precipitates by cooling of the previously heating lime solution. The operating system is based on developing an algorithmic operating control system set point by developing a formula to calculate the required quantity of water required to achieve a time/temperature profile suitable to produce a SLS. The characteristics are optimized by adjusting the amount of water that is added to the mixture based upon the temperature of the incoming water and the predetermined hydration reaction temperature. The amount of heat extracted is maximized by allowing the reaction to run to completion before the next batch is initiated. The heat of reaction is used to preheat the water for the subsequent batch. Thus, the temperature of the process water is raised by capturing the heat of hydration and by transferring that heat into elevating the temperature of the process water. In order to keep the lime particles in suspension in the water, the reaction is allowed to run to completion, and then the mixture is cooled, preferably by adding ambient water, with the mixture then being aged in a separate slurry aging tank, followed by cooling of the mixture/solution in a slurry aging tank via the water jacket 27.

This invention also provides an automated system for automatically and continuously delivering a dosage of high-quality SLS, preferably in batches, comprising automating the steps of the methods described herein.

The system of this invention can be fully automatic and demonstrates the ability of the lime slaker 15 to allow the solid-liquid phased slaking reaction to run until completion, at a predetermined temperature, and then dilute to a predetermined slurry concentration. The system of the invention can be equipped with a control panel which provides a method of recording the time and slaking temperature. A chart can be generated for each batch showing time and temperature for the complete duration of the batch. At completion, the data can be printed and read to ensure compliance with all requirements of the system including the initial water temperature, weight of lime per batch, weight of water per batch, final slaking temperature and time required to reach that temperature, and weight of cooling water per batch. This allows for automatically setting or resetting the amount of lime and water added to the lime slaker 15.

The above-described method can further comprise the step of dissolving scale build-up in the lime slaker 15 or the lime slurry aging tank 28 by performing an acid wash after the high-quality SLS is recovered. An example of an acid wash system of this invention is illustrated in FIG. 3.

Referring to FIG. 3, this invention also provides a method for removing scale build-up in a lime slaker 15, a lime slurry aging tank 28, or any delivery system comprising (a) monitoring scale build-up in the lime slaker 15 via monitor 100, the lime slurry aging tank 28 via monitor 101, and/or the delivery system including the separation device 64 via the monitor 122; and (b) at a pre-determined set point of scale buildup or time, delivering an acid wash solution to the lime slaker 15, the lime slurry aging tank 28 and/or the delivery system by use of an acid wash pump 102, thereby dissolving the scale build-up.

The acid is placed into the lime slaker 15 through an inlet 103 thereof, in the direction of the arrow 104, either manually or automatically. If automatically, the computer 18, acting in response to one or more scale build-up monitors 100, 101 and 122, through control line 89, discharges acid from acid supply 99 through supply line 109 to inlet 103.

The acid enters the lime slaker 15 above the liquid level 105 thereof. Water is delivered via line 27, as needed, into the lime slaker 15, depending upon the operation of a valve 106, controlled either manually, or from the computer 18 via control line 107. As acid enters the lime slaker 15, it is extracted after mixing with liquid therein, via line 108, upon opening of the valve 110 at the bottom thereof, which valve 110 can be controlled from the computer 18 via control line 111, and then the pump 102, activated via control line 112 from the computer 18, or manually, can deliver the acid/water solution back into the lime slaker 15 via line 113, 115, lines 21 and/or 22 to the spray nozzles 114 that are disposed above the liquid level 105, in order to expose the entirety of the lime slaker 15 to the acid wash. The acid rinse line 113 also delivers the acid rinse to the aging tank 28 via lines 115 and 116, to enter the aging tank 28 via one or more spray nozzles 117 therein, also located above the liquid level 118 thereof. Similarly, the acid wash is delivered to the separation device 64 by means of the pump 102, through line 113, line 115 and line 120, to enter the separation device 64 through one or a plurality of spray nozzles 121. Then, the generally continuous recirculation of the acid rinse from aging tank 28, via pump 62, delivery line 63, and back into the separation tank 64, then back into the aging tank 28 via line 67, continues the recirculation of the acid wash. The monitors 100 in the slurry tank 15, 101 in the aging tank 28, and 122 in the separation device 64, can continually monitor the level of scale build-up in those vessels, and can communicate via signal lines 123, 124 and 125, respectively, to signal to the computer 18 when it is necessary to provide the acid rinse described above to the various equipment in the system. Then, the acid wash can be implemented manually or automatically.

When the monitoring step and delivering step are performed in the lime slaker 15, this method can further comprise the step of discharging the acid wash solution from the lime slaker 15 to the lime slurry aging tank 28 and any other part of the system. In addition, this method can further comprise the step of adding a SLS to elevate the pH of the acid wash solution. This enables the system to be ready for more slaking.

The acid wash system of the invention can be applied to the lime slaker 15, lime slurry aging tank 28, or any other part of the system. Spray nozzles can be positioned to be above the liquid level so that the nozzles delivering lime and water can be cleaned during the acid wash cycle. At least two spray nozzles can be installed in a vessel to maximize the coverage of the acid wash spray. The spray nozzles 114 can be eliminated, and water could be delivered directly into the lime slaker 15 via lines 21, 22, in order to flood the lime slaker 15 with the acid solution. The water entering the lime slaker 15 in order to accomplish the acid wash can be under sufficient pressure to suit varied condition, and can be applied with variations in pressure, to provide a scouring system along with the solvent or acid, to aid in the cleaning of the entire system. In this regard, the entire system can include not only any of the lime slaker, aging tank and grit separation device, but also the various piping, including the lines 30, 61, the pump 62, 63, and dosing sub-systems, including the extraction line 76, valve 77, grit trap 78, line 80, magnetic flowmeter 81 and pinch valve 82 of FIG. 1, and, alternatively, the line 63, extraction line 76, valve 77, grit trap 78, line 80, magnetic flowmeter 81 and metering pump 82" of FIG. 1A. After the acid wash cycle, either a batch of lime slurry or water can be used to flush the system so that slaking can begin again in the cleaned system. This acid wash system enables the slaking system to run smoothly and provides adequate flow of the slurry in the system's conduits. If the acid wash cycle is to be automatically triggered, it can be set to start at certain times, or after a certain number of slaking cycles, or by measuring the build-up of scale by use of the load cells instead of the monitors 100, 101 and 122. In the case of using the load cell, the system utilizes a system wherein the weight of scale is calculated and when a critical mass is reached, the acid wash cycle is triggered.

The automatic acid washing system of this invention is thus able to use a solvent such as an acid where the lime slaker, the slurry aging tank, and the remainder of the delivery system, including the grit separation device can be neutralized and whereby any scale build-up can be dissolved. The quantity of scale that is present in each batch being treated in the slaking apparatus of this invention, being monitored by the monitors 100, 101 and 122 can be recorded in the computer 18, and when the level of scale build-up reaches a predetermined set point, or alternatively, on a periodic basis, a rinse cycle can be initiated whereby acid can be added to the lime slaking tank 15, either manually through the access opening 103 thereof, or automatically from the above-described acid feed into the access opening 103, and whereby water is added to the lime slaker 15 as described above, at a level above the liquid levels in the lime slaker, the aging tank, and the separation device, in such a manner that the entire contents of all of the equipment are totally rinsed by feeding the acid/water through spray nozzles throughout the system, as described above. The rinse solution in the lime slaking apparatus 15 can be discharged into the slurry aging tank 28 and the process can be repeated before the rinse solution is introduced into the delivery system. The delivery system can be cleaned by dosing a predetermined, variable and precise quantity of solvent solution into the potable water treatment process. The flow rate or rates of dosing, as addressed in the description above with respect to FIG. 2, can be the same, or variable, and such can be monitored and such information can be fed back to the computer control 18, or to a manual control, if desired. Thus, while it is known that lime produces scaling in the apparatus that handles the same, the scale can be removed to increase the reliability of the system, by measuring scale build-up and removing the same upon the scale build-up reaching a predetermined level, or periodically based upon a timed repeat scale-removal system. The system also sprays the acid/water solution throughout the equipment above the liquid level in the various lime slaker 15, aging tank 28, and separation device 64, as described above, with the acid/water solution also being run through the loop 63, and dosed at any of various controlled rates into the water supply, either with or without increasing the pH of the acid solution by adding a batch of supersaturated lime solution into the slurry aging tank.

Referring to FIG. 1, the apparatus for carrying out a process of slaking lime in batches can be seen. Valves 40, 41, 42 and 43 and piping 33, 21, 22, and 23 are provided to supply water at an ambient water temperature to a lime slaker 15. The valves 40, 41, and 42 and piping 33, 21, 22, and 23, in addition to valve 54 and pipe 26, are also used to supply water heated to a temperature higher than the ambient water temperature to the lime slaker 15 as will be explained below.

The process includes the step of providing water to the lime slaker 15. The water may be ambient water, a combination of ambient water and heated water coming from the water heater 34, or entirely heated water coming from the water heater 34. The total amount by weight of water supplied in this step is in a predetermined amount required to provide the desired slaked lime concentration in the current batch of slaked lime slurry that is to be produced in the lime slaker 15. The desired range of slaked lime concentration has been previously discussed. The signal from the one or more load cells 48, 50 is used by the programmable control system or computer 18 to determine when the predetermined amount by weight of water has been charged to the slaker 15, at which point the computer 18 shuts off the supply of water to the slaker by turning off one or more of the various valves 40, 41, 42, 43, and 54 as required.

The computer 18 uses the signal from temperature sensor 36 to control the ratio of ambient water to heated water coming from the water heater 34 and to control the heat supplied to the water heater 34 such the water temperature inside the slaker 15 is kept within the range of desired water temperatures that will ensure that the temperature of the contents of the slaker 15 at least upon completion of the slaking reaction is within the range of optimal reaction temperatures for the slaking reaction and at no time exceeds the range of optimal reaction temperatures. The range of optimal reaction temperatures for the slaking reaction and the range of desired water temperatures for the water charged to the slaker 15 have been previously discussed.

The content of the slaking vessel 15, refers to the material occupying the interior of the space defined by the wall of the slaker 15 located inward of the cooling jacket 20 and excludes the material inside the cooling jacket 20. Also, the inside or interior of the slaker 15 refers to the space inside the slaker 15 inward of the cooling jacket 20 and excludes the interior of the cooling jacket 20.

The content of the slurry aging tank 28, refers to the material occupying the interior of the space defined by the wall of the slurry aging tank 28 located inward of the cooling jacket 27 and excludes the material inside the cooling jacket 27. Also, the inside or interior of the slurry aging tank 28 refers to the space inside the slurry aging tank 28 inward of the cooling jacket 27 and excludes the interior of the cooling jacket 27.

Calcium oxide, which in the usual case has some percentage of grit particles in it, is provided or charged to the lime slaker 15 after the step of providing water to the lime slaker 15. The total amount by weight of calcium oxide supplied in this step is in a predetermined amount required to provide the desired slaked lime concentration in the current batch of slaked lime slurry that is to be produced in the lime slaker 15. The signal from the one or more load cells 48, 50 is used by the programmable logic control system or computer 18 to determine when the predetermined amount by weight of calcium oxide has been charged to the slaker 15, at which point the computer 18 shuts of the supply of calcium oxide to the slaker 15 by turning off the lime delivery conveyor 13.

The chemical reaction between the water and calcium oxide is then allowed to take place, whereby the calcium oxide and water combine to produce calcium hydroxide and heat in an exothermic reaction in the lime slaker 15. As already mentioned, the heating device 34, can be used for preheating at least some of the water supplied to the slaker 15 to an elevated temperature above an ambient water temperature when necessary as indicated, for example, by the temperature sensor 36. A jacket 20 is provided around the lime slaker 15. In the chemical reaction between the water and calcium oxide, calcium oxide is hydrated to form calcium hydroxide ($Ca(OH)_2$) in an exothermic reaction. At least some of the heat of hydration from the exothermic reaction can be captured by passing at least a portion of the water to be supplied to the slaker 15 through the jacket 20. The temperature of the water in the jacket 20 may increase as much as about 20° F. or more. Thereafter, the water can pass from the jacket 20 to the heating device 34 before it is allowed to enter the slaker 15. The predetermined weight of water that is supplied or charged to the slaker 15 can include water from an ambient water source, water from the heating device 34, or a mixture of water from these sources. Because the water from the jacket 20 is supplied to the heater 34, the exothermic heat of reaction from slaking one batch of lime feed stock can be used to reduce the energy required by the heating device 34 to heat the water supplied to the lime slaker 15.

In one embodiment of the invention, the programmable control system or computer 18 controls the heat supplied to the water from the jacket 20 by the heating device 34, the amount of water passing from the heating device 34 to the lime slaker 15, and the amount of water at ambient temperature supplied to the lime slaker 15 to ensure that the temperature of the weight of water charged to the slaker 15 just after the step of supplying water to the slaker is complete, but before any lime feed stock is added to the slaker, is within a range calculated by the computer 18 to ensure that the temperature of the contents of the slaker 15 at completion of the slaking reaction will not exceed a predetermined optimum temperature range as previously described. The calculation of the initial temperature of the weight of the water charged to the slaker 15 may be based on at least some of the data including, but not limited to, the ambient water temperature, the known heat capacities of the materials involved, the known heat of the hydration reaction, the predetermined weights of the water and lime feed stock to be charged to the slaker 15, and data from previous or test batches of slaked lime produced.

After the addition of water and lime feed stock to the lime slaker 15 is complete, the slaking reaction is allowed to run to completion. The end point or completion of the slaking reaction is detected when the temperature of the contents of the slaker 15 reach the predetermined hydration reaction temperature within the ranges previously discussed.

It will be understood that various modifications may be made to the system, including its method steps and apparatus, and its operation, all within the spirit and scope of the invention as defined in the appended claims.

The invention claimed is:

1. A process for producing slaked lime slurry comprising the steps of:
   providing a slaking vessel having at least one support location that is provided with at least one load cell, wherein the load cell provides a signal indicative of a total weight of the slaking vessel and its contents;
   charging a predetermined weight of water to the slaking vessel by using the signal from the load cell to stop charging water to the slaking vessel when the signal from the load cell indicates that the predetermined weight of water has been charged to the slaking vessel, wherein the water has a temperature;
   charging a predetermined weight of lime feed stock to the slaking vessel by using the signal from the load cell to stop charging lime feed stock to the slaking vessel when the signal from the load cell indicates that the predetermined weight of lime feed stock has been charged to the slaking vessel, wherein the lime feed stock comprises calcium oxide (CaO), and wherein said step of charging a predetermined weight of lime feed stock to the slaking vessel is performed after said step of charging a predetermined weight of water to the slaking vessel is completed;

allowing the calcium oxide to undergo a slaking reaction with the water in the slaking vessel at least until the slaking reaction substantially reaches completion, wherein the predetermined weight of water charged to the slaking vessel is in excess of the weight of water required by stoichiometry of the slaking reaction for hydration of all the calcium oxide in the predetermined weight of lime feed stock charged to the slaking vessel;

controlling the temperature of the water such that the water is at a temperature within a predetermined range before the lime feed stock is charged to the slaking vessel, the predetermined temperature range of the water being selected such that the contents of the slaking vessel are at a temperature in the range of 175° F. to 195° F. (79 degrees C. to 91 degrees C.) at least when the slaking reaction substantially reaches completion, and wherein no cooling or dilution water is added to the contents of the slaking vessel after said step of charging a predetermined weight of water to the slaking vessel and before the slaking reaction substantially reaches completion; and discharging the slaked lime slurry from the slaking vessel after the slaking reaction substantially reaches completion.

2. The process for producing slaked lime slurry according to claim 1, wherein the contents of the slaking vessel are at a temperature in the range of 160° F. to 212° F. (71 degrees C. to 100 degrees C.) at least when the slaking reaction substantially reaches completion.

3. The process for producing slaked lime slurry according to claim 1, wherein the lime feed stock comprises at least 90 percent calcium oxide (CaO) and at least some grit but not exceeding 10 percent grit.

4. The process for producing slaked lime slurry according to claim 1, wherein the weight of lime feed stock charged to the slaking vessel is 5 percent to 45 percent of the total weight of the water and the lime feed stock charged to the slaking vessel.

5. The process for producing slaked lime slurry according to claim 1, wherein the weight of water and the weight of lime feed stock charged to the slaking vessel are in a ratio selected such that a slaked lime slurry resulting from the weight of water and the weight of lime feed stock charged to the slaking vessel is suitable for use in one or more target applications without dilution of the slaked lime slurry by adding water to the slaked lime slurry after the slaking reaction substantially reaches completion.

6. The process for producing slaked lime slurry according to claim 1, wherein the temperature of the water before the lime feed stock is charged to the slaking vessel, is controlled to be within a range of 50° F. to 80° F.

7. The process for producing slaked lime slurry according to claim 1, further comprising the steps of:
providing a slurry aging tank;
providing a grit separation device to remove grit from the slaked lime slurry;
providing a discharge line for circulating slaked lime slurry from the slurry aging tank to the grit separation device, wherein the discharge line passes through one or more dosing locations;
providing a return line from the grit separation device to the slurry aging tank;
conveying the slaked lime slurry from the slaking vessel to the slurry aging tank after the slaking reaction has substantially reached completion;
circulating slaked lime slurry from the slurry aging tank to the grit separation device and returning the slaked lime slurry from the grit separation device to the slurry aging tank to remove grit from the slaked lime slurry; and
providing a dosing sub-system to deliver a controlled amount of slaked lime slurry at each dosing location as needed under the control of an operator or a controller.

8. The process for producing slaked lime slurry according to claim 7, further comprising the steps of:
repeating said step of controlling the temperature of the water such that the water is at a temperature within a predetermined range before the lime feed stock is charged to the slaking vessel, said step of charging a predetermined weight of water to the slaking vessel, said step of charging a predetermined weight of lime feed stock to the slaking vessel, said step of allowing the calcium oxide to undergo a slaking reaction with the water in the slaking vessel, said step of discharging the slaked lime slurry from the slaking vessel, and said step of conveying the slaked lime slurry from the slaking vessel to the slurry aging tank, in order to provide one or more subsequent batches of slaked lime slurry to the slurry aging tank to ensure that there is an adequate supply of slaked lime slurry in the slurry aging tank as required.

9. The process for producing slaked lime slurry according to claim 8, further comprising the steps of:
providing a jacket around the slaking vessel;
cooling the contents of the slaking vessel prior to said step of discharging the slaked lime slurry from the slaking vessel by providing water within the jacket; and
using the water from the jacket to provide at least in part the weight of water charged to the slaking vessel for producing one of the one or more subsequent batches of slaked lime slurry.

10. The process for producing slaked lime slurry according to claim 9, further comprising the steps of:
providing a jacket around the slurry aging tank; and
arranging for the water provided within the jacket of the slaking vessel to pass through the jacket of the slurry aging tank.

11. The process for producing slaked lime slurry according to claim 7, wherein said step of providing a dosing sub-system comprises the steps of:
providing a dosing subsystem line in communication with the discharge line and extending to a dosing discharge at a respective dosing location;
providing a first valve in the dosing sub-system line;
providing a grit trap between the first valve and the dosing discharge;
providing a flowmeter between the grit trap and the dosing discharge; and
providing a pinch valve between the flowmeter and the dosing discharge.

12. The process for producing slaked lime slurry according to claim 1, wherein a mixture resulting from the weight of water and the weight of lime feed stock charged to the slaking vessel and including reaction products thereof, at any time after said step of charging a predetermined weight of lime feed stock to the slaking vessel and before said step of discharging the slaked lime slurry from the slaking vessel, forms the contents of the slaking vessel, the process for producing slaked lime slurry further comprising the steps of:
monitoring the temperature of the contents of the slaking vessel using a temperature sensing device; and determining that the slaking reaction has substantially reached completion when the temperature of the contents of the slaking vessel is not increasing over a predetermined time period.

13. The process for producing slaked lime slurry according to claim 1, further comprising the steps of:
providing a heater for heating at least part of the weight of water to be charged to the slaking vessel; and
providing a water temperature sensing device to sense the temperature of the weight of water charged to the slaking vessel, and
wherein said step of controlling the temperature of the water such that the water is at a temperature within a predetermined range before the lime feed stock is charged to the slaking vessel comprises the steps of:
monitoring the temperature of the water being charged to the slaking vessel; and
heating at least part of the water to be charged to the slaking vessel to ensure that the weight of water charged to the slaking vessel is at a temperature within the predetermined temperature range.

14. An apparatus for producing slaked lime slurry comprising:
a programmable control system;
a slaking vessel having at least one support location that is provided with at least one load cell, wherein the load cell provides a load cell signal indicative of a total weight of the slaking vessel and its contents, said load cell communicating with said programmable control system such that said load cell signal can be received by said programmable control system;
slaking vessel temperature sensing means for sensing the temperature of the contents of said slaking vessel, wherein said slaking vessel temperature sensing means provides a slaking vessel temperature signal indicative of the temperature of the contents of said slaking vessel, said slaking vessel temperature sensing means communicating with said programmable control system such that said slaking vessel temperature signal can be received by said programmable control system;
means for charging water into the slaking vessel, said programmable control system communicating with said means for charging water into the slaking vessel, said programmable control system stopping the charging of water into said slaking vessel when said load cell signal indicates that a predetermined weight of water has been charged into said slaking vessel, wherein the water charged into said slaking vessel has a temperature;
means for mixing the content of said slaking vessel;
water temperature control means for controlling the temperature of the water charged into said slaking vessel, said water temperature control means communicating with said programmable control system, said programmable control system controlling said water temperature control means such that the temperature of the water charged into said slaking vessel is within a predetermined water temperature range;
means for charging lime feed stock into the slaking vessel, said programmable control system communicating with said means for charging lime feed stock into the slaking vessel, said programmable control system stopping the charging of lime feed stock into said slaking vessel when said load cell signal indicates that a predetermined weight of lime feed stock has been charged into said slaking vessel, thereby allowing a slaking reaction to take place; and
means for discharging the contents of said slaking vessel; said programmable control system communicating with said means for discharging the contents of said slaking vessel, said programmable control system monitoring the temperature of the contents of said slaking vessel using said slaking vessel temperature signal, said programmable control system operating said means for discharging the contents of said slaking vessel to discharge the contents of said slaking vessel when the temperature of the contents of said slaking vessel remains within a predetermined temperature range for a predetermined period of time;
wherein said programmable control system controls the temperature of the water charged into said slaking vessel such that the contents of said slaking vessel will be at a temperature in the range of 180° F. to 195° F. (82 degrees C. to 91 degrees C.) at least when the slaking reaction substantially reaches completion, said programmable control system determining the temperature range for the water to be charged to said slaking vessel using at least the predetermined weight of the water to be charged to said slaking vessel and the predetermined weight of the lime feed stock to be charged to said slaking vessel, wherein said programmable control system operates said water temperature control means such that the water temperature of the water charged to said slaking vessel is initially within the water temperature range determined by said logic means before the lime feed stock is charged to the slaking vessel;
wherein said water temperature control means comprises a heater supplied with energy from an auxiliary energy source.

15. The apparatus according to claim 14, wherein the slaking reaction generates heat, wherein said slaking vessel has a jacket surrounding an inner compartment where the contents of the slaking vessel are held at least during the slaking reaction, and wherein said water temperature control means further comprises:
piping and one or more valves controlled by said programmable control system to direct at least a portion of the water to be charged to said slaking vessel into and out of said jacket to thereby recover at least a part of the heat generated by the slaking reaction and at least reduce the energy required for heating water by said heater;
piping for directing water from said jacket to said heater;
piping and valves for directing one of water from a process water supply source, water from said heater, and a mixture thereof to said slaking vessel.

16. The apparatus according to claim 15, wherein the contents of said slaking vessel after the slaking reaction substantially reaches completion is in the form of a slaked lime slurry, wherein a slurry aging tank is provided and said slurry aging tank has a jacket surrounding an inner compartment where the slaked lime slurry is stored, and wherein the at least a portion of the water to be charged to said slaking vessel is directed into and out of said jacket of said slurry aging tank before it is directed into said jacket of said slaking vessel.

17. A process of slaking lime in batches comprising the steps of:
(a) providing valves and piping to supply water at an ambient water temperature to a lime slaker;
(b) providing water to the lime slaker;
(c) providing calcium oxide and grit particles to the lime slaker after said step of providing water to the lime slaker;

(d) allowing a chemical reaction to take place, whereby the calcium oxide and water combine to produce calcium hydroxide and heat in an exothermic reaction in the lime slaker;

(e) providing a heating device for preheating water to an elevated temperature above an ambient water temperature, wherein the heating device uses an energy source other than heat from the exothermic chemical reaction of said step of allowing a chemical reaction;

(f) capturing heat of hydration from the exothermic reaction by providing a jacket around the lime slaker and passing water through the jacket;

(g) supplying water from the jacket to the heating device, wherein said step of providing water to the lime slaker comprises supplying water from the heating device to the lime slaker;

(h) controlling the heat supplied to the water from the jacket by the heating device, controlling the amount of water passing from the heating device to the lime slaker, controlling an amount of water at ambient temperature supplied to the lime slaker, and controlling an amount of calcium oxide and grit particles supplied to the lime slaker, at least based upon:

(A) the temperature of the water in the lime slaker prior to said step of providing calcium oxide and grit particles to the lime slaker; and (B) a predetermined hydration reaction temperature; and (i) allowing the chemical reaction to run to completion.

18. An apparatus for carrying out a process for producing slaked lime slurry in accordance with claim 17, the apparatus comprising:

a programmable control system;

a slaking vessel having at least one support location that is provided with at least one load cell, wherein the load cell provides a load cell signal indicative of a total weight of the slaking vessel and its contents, said load cell communicating with said programmable control system such that said load cell signal can be received by said programmable control system;

slaking vessel temperature sensing means for sensing the temperature of the contents of said slaking vessel, wherein said slaking vessel temperature sensing means provides a slaking vessel temperature signal indicative of the temperature of the contents of said slaking vessel, said slaking vessel temperature sensing means communicating with said programmable control system such that said slaking vessel temperature signal can be received by said programmable control system;

means for charging water into the slaking vessel, said programmable control system communicating with said means for charging water into the slaking vessel, wherein the water charged into said slaking vessel has a temperature;

means for mixing the content of said slaking vessel;

water temperature control means for controlling the temperature of the water charged into said slaking vessel, said water temperature control means communicating with said programmable control system, said programmable control system controlling said water temperature control means such that the temperature of the water charged into said slaking vessel is within a predetermined water temperature range, wherein said water temperature control means comprises a heater supplied with energy from an auxiliary energy source;

means for charging lime feed stock into the slaking vessel, said programmable control system communicating with said means for charging lime feed stock into the slaking vessel, said programmable control system operating said means for charging lime feed stock into the slaking vessel to charge lime feed stock into said slaking vessel, thereby allowing a slaking reaction to take place; and means for discharging the contents of said slaking vessel; said programmable control system communicating with said means for discharging the contents of said slaking vessel, said programmable control system monitoring the temperature of the contents of said slaking vessel using said slaking vessel temperature signal, said programmable control system operating said means for discharging the contents of said slaking vessel to discharge the contents of said slaking vessel when the temperature of the contents of said slaking vessel remains within a predetermined temperature range for a predetermined period of time indicative of the completion of the slaking reaction.

\* \* \* \* \*